United States Patent
Nascenzi et al.

(10) Patent No.: US 6,879,960 B2
(45) Date of Patent: Apr. 12, 2005

(54) METHOD AND SYSTEM FOR USING CUSTOMER PREFERENCES IN REAL TIME TO CUSTOMIZE A COMMERCIAL TRANSACTION

(75) Inventors: Robert A. Nascenzi, San Diego, CA (US); Grant M. Anderson, Oceanside, CA (US); Auke Jan van den Hout, Amsterdam (NL)

(73) Assignee: Claritas, Inc., San Diego, CA (US)

( * ) Notice: Subject to any disclaimer, the term of this patent is extended or adjusted under 35 U.S.C. 154(b) by 750 days.

(21) Appl. No.: 09/729,129

(22) Filed: Dec. 1, 2000

(65) Prior Publication Data

US 2002/0099609 A1 Jul. 25, 2002

(51) Int. Cl.[7] .............................................. G06F 17/60
(52) U.S. Cl. ........................................ 705/14; 705/21
(58) Field of Search .............................. 705/21, 14, 26

(56) References Cited

U.S. PATENT DOCUMENTS

| | | | |
|---|---|---|---|
| 5,948,061 A | * | 9/1999 | Merriman et al. .......... 709/219 |
| 5,991,735 A | * | 11/1999 | Gerace ......................... 705/10 |
| 6,070,147 A | * | 5/2000 | Harms et al. ................. 705/14 |
| 6,298,330 B1 | * | 10/2001 | Gardenswartz et al. ....... 705/14 |
| 6,490,567 B1 | * | 12/2002 | Gregory ....................... 705/39 |

FOREIGN PATENT DOCUMENTS

| | | | | |
|---|---|---|---|---|
| EP | 822535 | * | 2/1998 | .................. 705/14 |

OTHER PUBLICATIONS

Business Wire, "Claritas Announces Second in Its Suite of Internet–Deliverable Products; MyBestCustomers Comes Less Than a Month After the Launch of MyBestProspects", Aug. 1,2000.*

Business Wire, Sagent Partners With Claritas to Deliver Real–time Marketing Information for More Effective Customer Analysi Mar. 29, 2000.*

* cited by examiner

*Primary Examiner*—Richard Chilcot
(74) *Attorney, Agent, or Firm*—Duckor Spradling Metzger & Wynne; Bernard L. Kleinke

(57) ABSTRACT

A method and system for facilitating a transaction between a merchant and the customer comprising a merchant computer server utilizing a memory containing a database of transaction relevant customer information including customer postal information to provide such information in the form of a customized communication at the point-of-contact between a merchant and the customer is provided. Customer identification information is used to store an anonymous identification tag on the customer computer, the tag providing an address to a segment of the database of transaction relevant customer information. The anonymous tag on the customer computer is accessed by the merchant computer when the customer computer contacts the merchant computer. An embodiment for a syndicate of merchants and a shared system server having a memory of transaction relevant customer information also is provided.

23 Claims, 4 Drawing Sheets

METHOD AND SYSTEM FOR USING CUSTOMER PREFERENCES IN REAL TIME TO CUSTOMIZE A COMMERCIAL TRANSACTION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates generally to commercial transactions and more specifically to a method and system for using relevant customer preferences in real time to customize a commercial transaction.

2. Related Art

Business intelligence information about a customer is helpful for marketing sales and services to the customer. This is particularly relevant to internet purchasing where use of personalized customer preferences can be employed to market additional product and services to a prior customer. On the internet, a customer preference profile is typically obtained by requesting the customer to respond to a list of questions asking about demographic personal information and other factors that relate to buying preferences or from tracking the customer's activity on the internet. The company then uses a computer program to model a profile for the client and to prepare a general model that predicts the outcome of future customer contacts.

This approach is problematic for several reasons. First, customer compliance is often incomplete as the customer finds the process tedious and personally invasive. In addition, it is time consuming for each business to collect, store and process this information. Moreover, retail merchants are not expert in modeling the input data and often fail to apply sufficient resources to properly use the data. As a further consideration, there may be potential liability associated with collecting and storing of customer personal information which needs to be protected from unauthorized access by others.

Thus, it would be beneficial to have a method and system that makes available in real time and at the point-of-contact, information about the customer demographics, buying preferences and lifestyle that need not be developed by the merchant. In addition, it would be useful if the information could be relevant to the customer but not personal to the customer.

SUMMARY OF THE INVENTION

The present invention is directed to methods and systems for solving the problem alluded to above, by using an individual merchant server computer with memory for storing a geodemographic database of transaction relevant customer information or a syndicate between two or more merchant server computers and a commonly shared system server computer with memory for storing a geodemographic database of transaction relevant customer information.

In the stand alone merchant server computer embodiment, when a customer computer accesses via a network the merchant server computer, the merchant server computer obtains customer identification information from the customer computer. The information is used to store an anonymous identification tag on the customer computer, for example as a cookie, the tag providing an address to a segment of the database of transaction relevant customer information that is relevant to the customer. When the customer computer later contacts the merchant server computer, the anonymous identification tag is retrieved from the customer computer and the tag is used to retrieve the segment of the transaction relevant customer information from the memory storing database, which is then used by the merchant server computer to customize communication between the merchant server computer and the customer computer.

In the syndicate embodiment, when a customer computer accesses via a network a merchant's server computer of the syndicate, the merchant server computer obtains customer identification information from the customer computer. The information is used to store an anonymous identification tag on the example as a cookie, the tag providing an address to a segment of the database of transaction relevant customer information that is relevant to the customer. When the customer later accesses any merchant server computer of the syndicate, the accessed syndicate merchant server computer retrieves the anonymous identification tag and uses it to access and retrieve transaction relevant customer information from the commonly shared system server computer memory. The retrieved information is used by the merchant to customize communication with the customer in real time and at the point-of-contact.

Also provided herein are additional embodiments as well as systems for carrying out the methods discussed above.

BRIEF DESCRIPTION OF THE DRAWINGS

The various features and advantages of the present invention will become more clearly appreciated as a detailed description of the preferred embodiment is given with reference to the appended drawings in which.

DETAILED DESCRIPTION OF THE PREFERRED EMBODIMENTS

Figure 1:
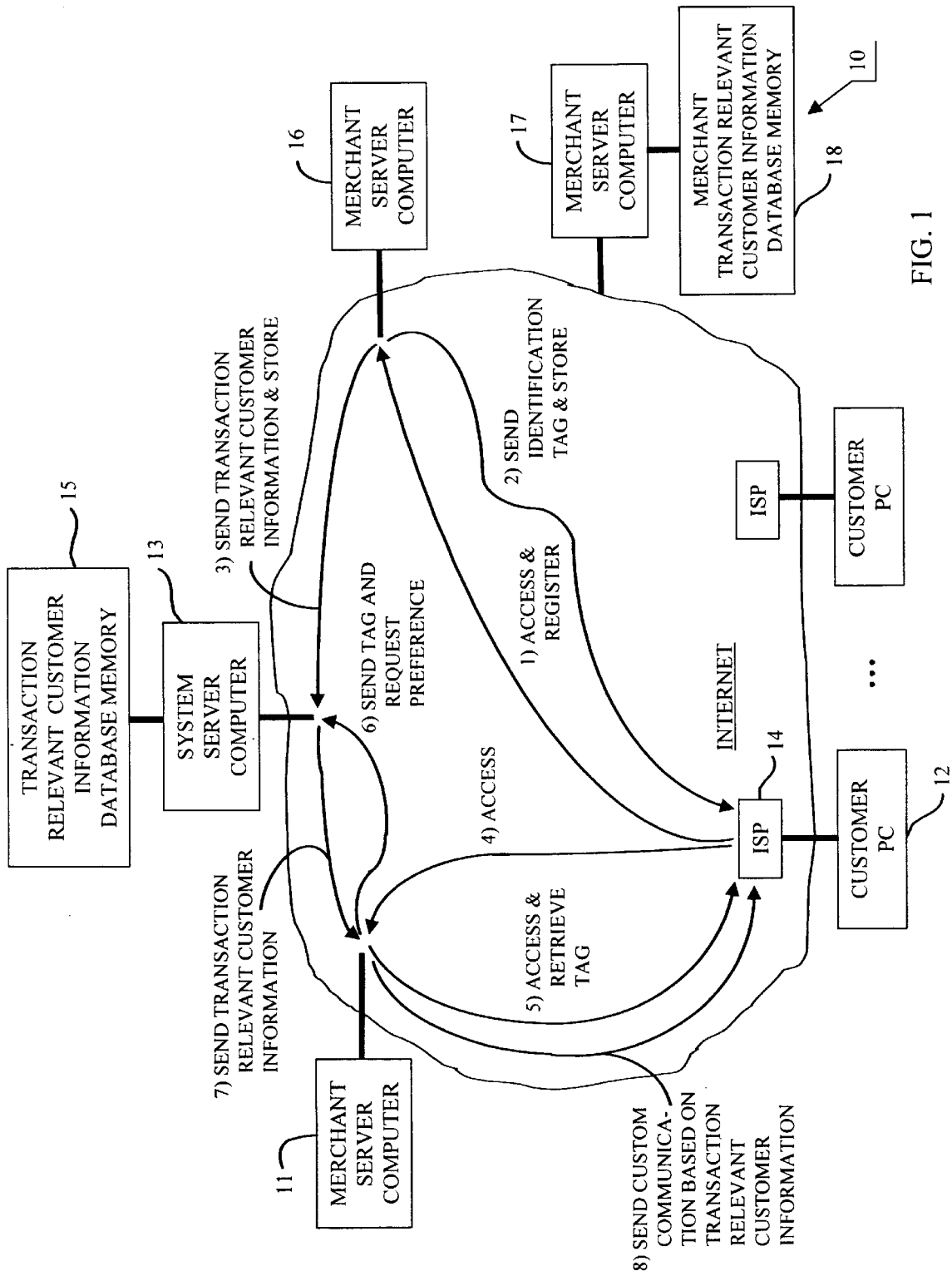
FIG. 1 is a schematic of several embodiments of the invention providing an overview of the architecture of the customer PC, merchant server computer and database-containing server computer interactions.

FIGS. 1–4 show various embodiments of the invention. FIG. 1 is diagram showing two embodiments of the computing system formed in accordance with the present invention. In one embodiment depicted in FIG. 1, syndicate 10 of merchant server computers such as computers 11, and 16 are linked to a commonly shared system server computer 13, which contains a memory 15 for a transaction relevant customer information database.

As used herein, transaction relevant customer information includes information that a merchant would consider useful at the point-of contact with the customer. Point-of-contact includes contact between the merchant and the customer where the customer is seeking information about products or services and/or is seeking to enter into a transaction with the merchant.

Transaction relevant customer information preferably include geodemographic customer buying preferences and lifestyles. Geodemographic information refers to household buying preferences that are not linked to any single household, but are linked to all households within a geographic location. Geodemographic information is preferably kept in a separate database from other transaction relevant customer information such as personal information and past purchasing information. The use of geodemographic information is preferred, because it is not personal to the individual customer as in the case of the foregoing mentioned personal information. Thus, by not utilizing personal information, the privacy of the customer can be more completely protected and respected.

Returning to FIG. 1, in use, customer personal computer ("PC") such as personal computer 12, uses the internet for example through an internet server provider (ISP) 14 to access and register as indicated above 1 at a syndicate merchant server computer such as the computer 16. The registration prompts the customer to send customer identification information including postal information containing the customer's zip code, to the merchant server computer 16. The merchant server computer receives the information and causes the preparation of an anonymous identification tag, which is later sent to the customer PC 12 and stored therein preferably as a cookie. The identification tag preferably is an address to a segment of the geodemographic database that contains customer purchasing preferences and lifestyles that are relevant to the customer.

Preferably, the customer identification information is based on the registration information sent by the customer PC 14 to the merchant server computer 16. The anonymous identification tag preferably contains an address to the sector of the database containing customer preferences and lifestyles relevant to the customer. The anonymous identification tag also preferably contains no specific customer information.

In order to create the anonymous identification tag, the merchant server computer 16 sends as indicted at 2 the customer identification information regarding the customer to the system server computer 13 which geodemographically codes the information and stores this in the system server computer database memory 15. For example, the customer ZIP code is geodemographically coded by generating a segment address code which identifies that segment of database that is relevant to the customer. The code is stored in the database and all personal information identifying information including the customer's address or ZIP code is deleted. As indicated at 3, the database sector identifying code is then sent to the merchant server computer which uses it to create the anonymous identification tag for the customer PC. At a future time when the customer PC accesses as indicated at 5 a syndicate merchant server computer, such as the computer 11, and the merchant server computer retrieves the tag as indicated at 6 from the customer PC 12.

The merchant server computer sends as indicted at 7 the retrieved tag to the system server computer which uses the tag to locate and retrieve transaction relevant customer information stored in the memory geodemographic database. This information is directly related to the customers transaction preferences. The retrieved information is sent as indicted at 8 to the requesting merchant server computer 11 which processes this information to prepare a customized communication that is sent as indicated at 9 to the customer PC.

A stand alone merchant server computer embodiment is also depicted in FIG. 1. Where the merchant computer is not part of a syndicate and yet is constructed in accordance with the present invention. A stand alone merchant server computer 17 is connected to its own transaction relevant customer information geodemographic database memory 18. In this case, steps 1–9 in FIG. 1 are conducted as appropriate between a customer PC and the stand alone merchant server computer 17 and between the merchant server computer 17 and its transaction relevant customer information geodemographic database memory 18.

In a similar manner to the syndicate example, an anonymous identification tag is created from custom postal information (e.g., the ZIP code). The tag bears database sector identification information so that relevant customer information can be retrieved relating to a group of consumers residing in a given geographic area, without identifying the customer or storing persona, private information regarding a particular customer.

The customized communication is the merchant's web page which has been modified based on the transaction relevant customer information received by the merchant. Alternatively or in addition, the customized communication may include providing a customer service representative (sales representative) with information about the customer's buying preferences. This information may be used as part of communications on-line or by telephone between the customer service representative and the customer. In any case, the customized communication results in a more personalized experience by the customer and increased satisfaction and sales.

The customer PC can be coupled to the merchant server in one or more ways, including an internet connection (e.g. WWW) or a telephone wire connection using modulator/demodulators (modem) within the customer PC and merchant server computer. Other types of electronic communication devices can also be used by the customer such as a personal communication device, interactive television, and the like can be used provided that an identification can be stored on the customer's device.

Connections from the merchant server computer to the system server computer can be accomplished in various ways, including communication over cellular telephone systems or other wireless links such as microwave or infrared communication links, Ethernet, token ring or other local area or wide area network communications systems, internet communications, satellite communications, fiber optic communications, and the like. Communications between the syndicate merchant server computers and the shared system server computer can be secured by methods well known in the art such as by encryption to protect transfer of confidential customer information.

The customer PC can communicate with merchant server computer through the WWW or Internet-type network in a known manner. Thus, the customer PC can use an HTML-compatible browser (e.g., Netscape Navigator™ or Microsoft Internet Explorer™) to specify a link to a merchant server computer via a Uniform Resource Locator (URL).

As indicated above, transaction relevant customer information is sent as a data stream from the system server computer to the merchant computer that sends the customer identification tag. The data is preferably processed by a data processing program on the merchant's server computer which uses the data for customizing communication to the customer, preferably by a web page. The data processing program can filter data, and/or process the information resulting in the selective presentation of products and/or services to the customer that relates to their predicted buying preferences. Transaction relevant customer information also may be processed in a predefined manner for each merchant by a program at the system server computer, the result being a document formatted according to products such as in a web based catalog may differ under customization and may involve custom advertising of products and services outside of the catalog. In the latter case, the customized web page can provide a hyperlink to additional information about the product, its availability and cost.

The database memory associated with the system server computer includes one or more hard disk drives for storing the information. The database memory can comprise separate databases of information preferably located in different hard drives. For example, the database memory can contain one hard drive or set of linked hard drives for storing personal customer information as well as past purchase information while a second hard drive or set of linked hard drives can be used to store the geodemographic information.

Figure 2:
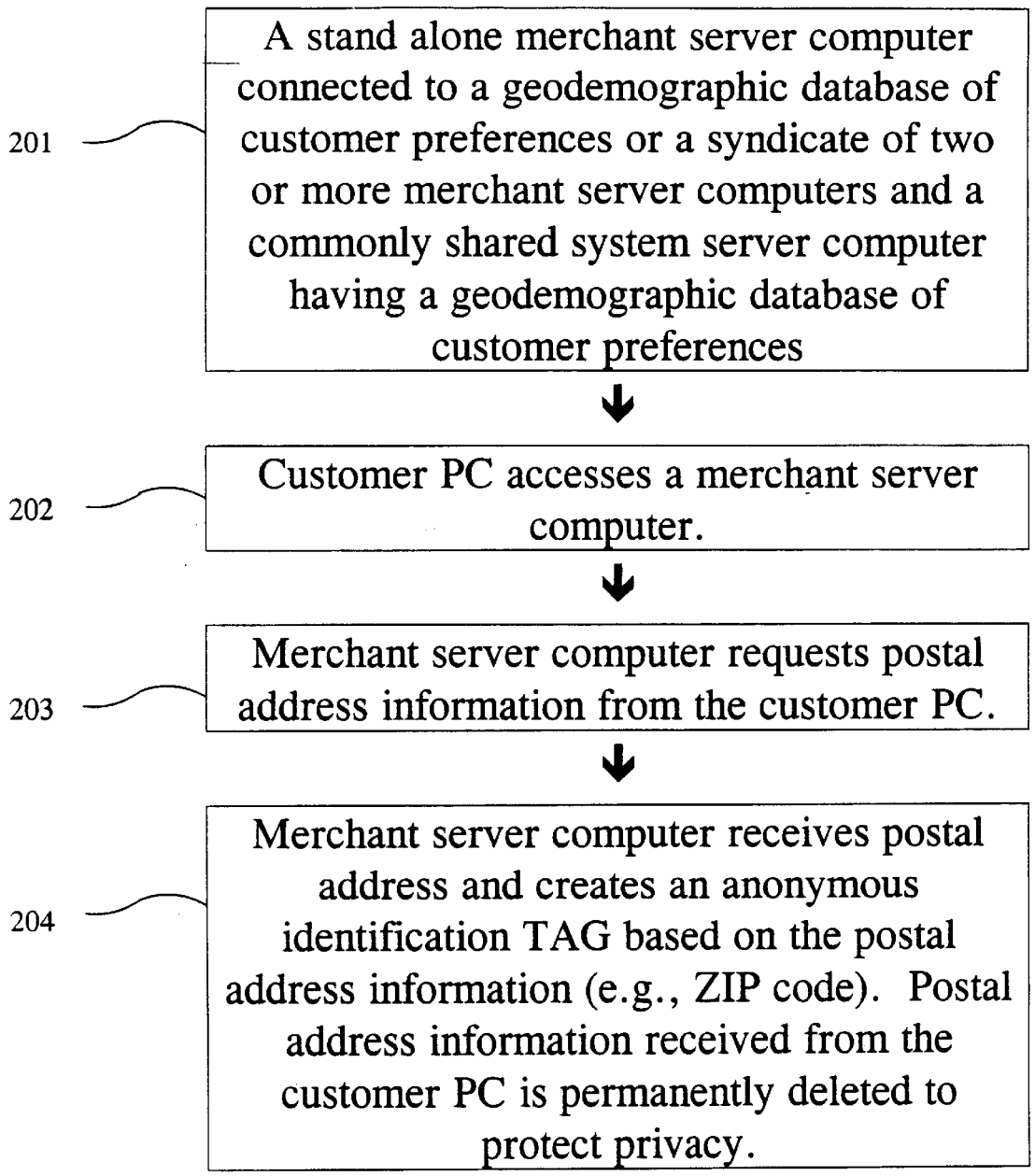
FIGS. 2 through 4 are general flow chart diagrams of digital information transmission according to an embodiment of the present invention.
Figure 3:
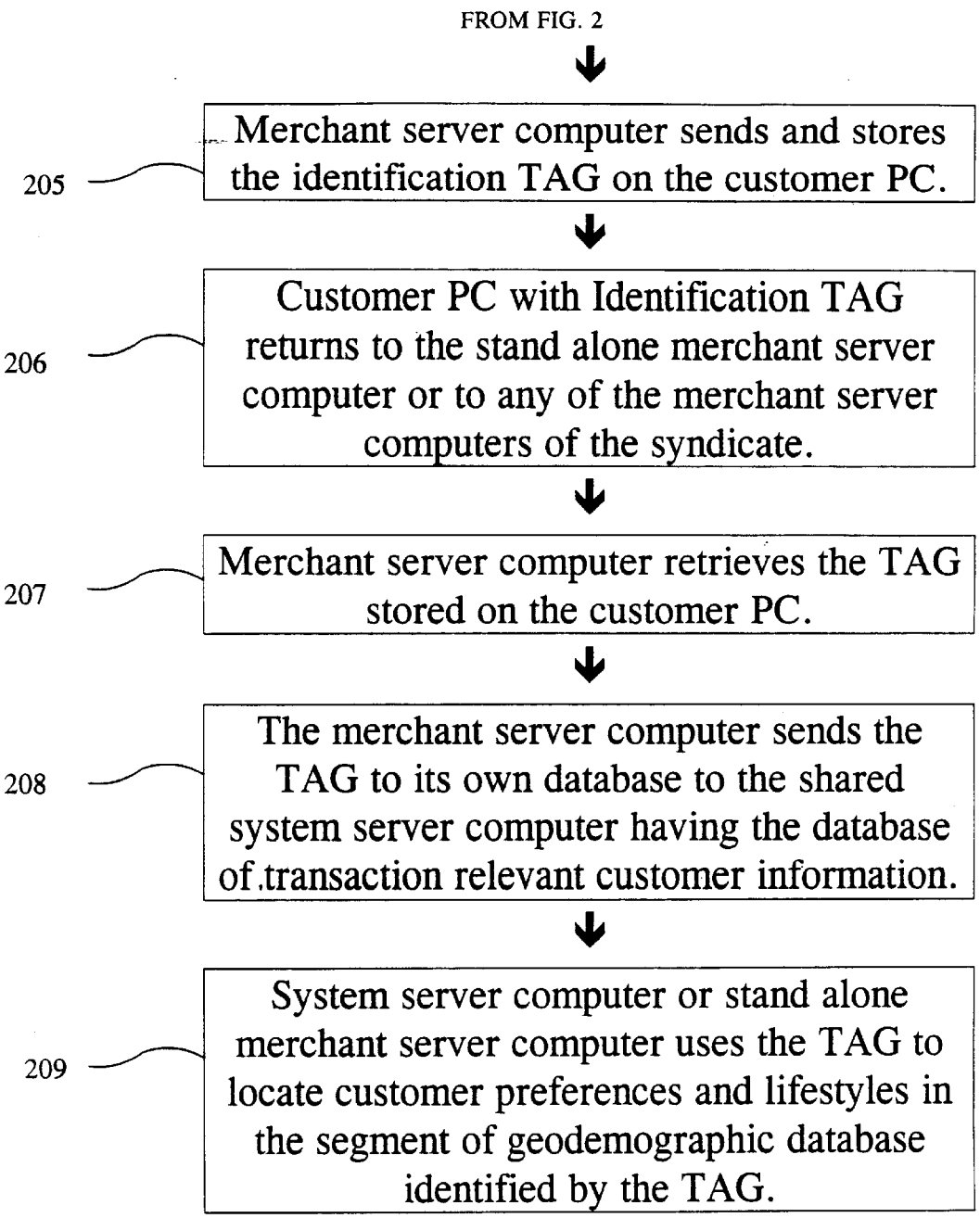
Figure 4:
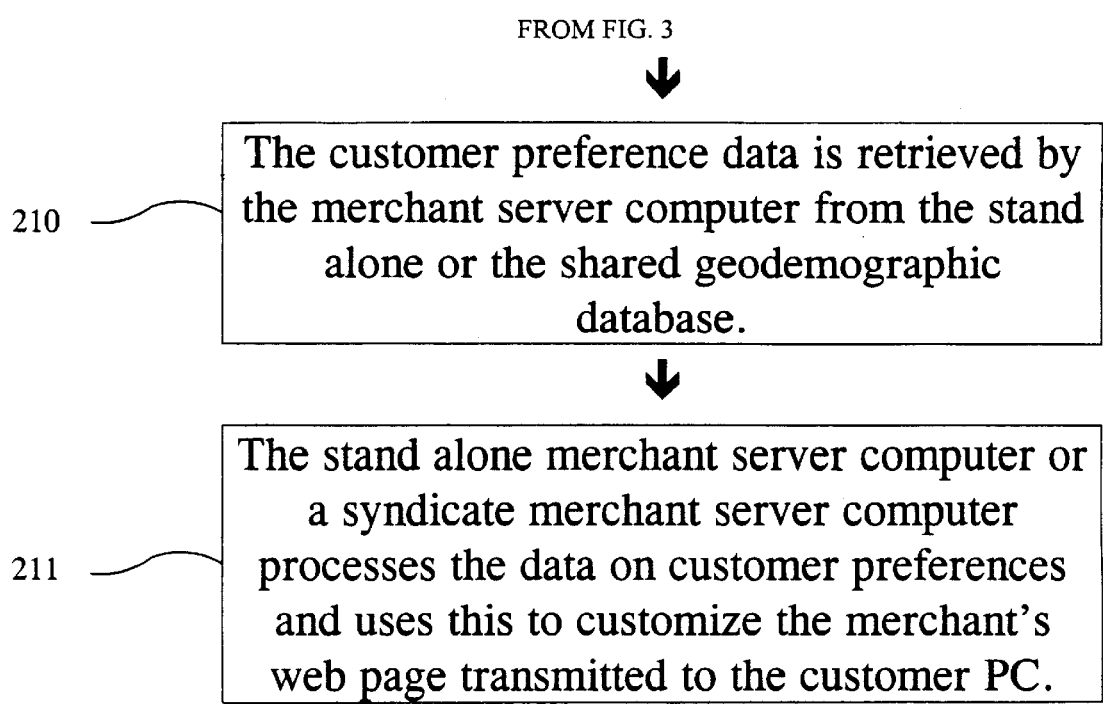

FIGS. 2–4 illustrate a method of the present invention which avoids storing personal confidential information about the customer by utilizing specifically geodemographic customer information. Using the inventive syndicate system 10 as above (indicated at box 201), when a customer PC contacts a stand alone merchant server computer or a merchant server computer of a syndicate (indicated at box 202), the merchant server computer requests postal mailing address information including the customer's ZIP code, from the customer PC (indicated at box 203). As previously described in greater detail, the merchant server computer receives the postal address information to create an anonymous TAG (indicated at box 204). All postal information received from the customer is PC is permanently deleted to protect the privacy of the customer.

The merchant server computer then sends and stores the anonymous TAG preferably as a cookie file on the customer PC (indicated at box 205). These first steps are information including the customer's ZIP code, from the customer PC (indicated at box 203). As previously described in greater detail, the merchant server computer receives the postal address information to create an anonymous TAG (indicated at box 204). All postal information received from the customer is PC is permanently deleted to protect the privacy of the customer.

The merchant server computer then sends and stores the anonymous TAG preferably as a cookie file on the customer PC (indicated at box 205). These first steps are designed to link the customer PC to the stand alone merchant or to the merchants of the syndicate when the customer again contacts and accesses the stand alone merchant server computer or any merchant server computers of the syndicate (indicated at box 206). At that time, the merchant server computer retrieves the TAG stored on the customer PC (indicated at box 207). The merchant server computer sends the TAG to its own database or to the shared database of transaction relevant customer information (indicated at box 208). The system server computer or stand alone merchant computer uses the TAG to look up customer buying preferences and lifestyles in the segment of the geodemographic database identified by the TAG (indicated at box 209).

The customer preference data is retrieved by merchant server computer from the stand alone or the shared geodemographic database (indicated at box 210). The stand alone merchant server computer or syndicate merchant server computer processes the data and uses it to customize the merchant's web page which is then sent to the customer (indicated at box 211). The steps from when the customer with the identification tag accesses a merchant server computer (stand alone or syndicate merchant) and receives a custom web page from the merchant server computer should occur very quickly so that the customer does not become impatient.

Geodemographic databases generally cover geographic buying preferences for products relating to all products and services, including telecommunication, energy, cable, retail, media and financial services. More specifically, the databases contain buyer preference information as follows: Telecom, relating to call waiting, caller ID, and additional lines; energy, relating to heat pumps, load control, and gas dryers; cable, relating to pay-per-view, cable radio and movie channels; retail, relating to jeans, shoes and jackets; media, relating to newspaper, radio and television; and financial, relating to banking, insurance, and brokerage. Geodemographic databases are well known in the art and include those from CACI (Arlington Va.) (e.g., ACORN), Experion (Orange, Calif.) (e.g., MOSAIC) and Claritas (San Diego, Calif.) (e.g. PRIZM).

For example, PRIZM is a reliable and accurate lifestyle segmentation system updated regularly to contain the latest information. PRIZM Cluster analysis begins with the U.S. Census database, which contains thousands of demographic data items from small neighborhood areas across the country. Also taped is a demographic sources and information from millions of consumer purchase records. The PRIZM model is based on demographic and lifestyle factors that best define a neighborhood type and predict consumer behavior including social rank, mobility, urbanization, household composition, ethnicity and housing. PRIZM assignments are built from the block group, the smallest piece of standard census geography for which information available. This ensures that the system accurately reflects both subtle variations in the population density within a neighborhood as well as key differences between neighborhood types. The result is a 62-cluster PRIZM system providing a flexible framework for decision making that's consistent from one level of geography to another. For instance, the PRIZM assignments for five-digit ZIP Codes can be accurately translated into PRIZM assignments for census blocks, census block groups, census tracts, or ZIP+4 areas. This ability to "upshift" or "downshift" from one level of geography to another—with total consistency—is a feature of PRIZM.

The following Table provides additional information about terms and concepts discussed above.

| | |
|---|---|
| Address Standardization & Census Coding | A complete and accurate address to code the consumer is needed. The merchant server computer "standardizes" the input address and appends it with the correct ZIP + 4 and Census block group number. |
| ZIP + 4 | A unit of postal geography that is comprised of 6–10 households. The ZIP + 4 is sometimes referred to as the nine-digit ZIP code (90120-1234). |
| Block Group | A unit of Census geography that is a collection of city blocks. It averages about 300 households. |
| MicroVision or PRIZM Coding | MicroVision: Based on the consumer's ZIP + 4, a MicroVision code of 1–48 is used for profiling. Segment codes "49 and 50" are not returned because they represent "anomalies" or "unclassifieds" which do not fit in any segment. If a consumer is a "50," no products is returned. PRIZM: Based on the consumer's Census Block Group, a PRIZM code of 1–62 is issued for profiling. |

| | -continued |
|---|---|
| National Profiles | The profiles represent segment penetration, national penetration, and the index to illustrate the likelihood a consumer will purchase a product. National profiles are derived from surveys conducted by database companies and cover all utilities providers. |
| Custom Profiles | Developed using a specific customer's products and services and purchasing behavior based on their portfolio. |
| Cross-Sell Messages | The output to the customer indicating which products the consumer is most likely to buy. |

The present invention can be applied to electronic on-line shopping systems which allow a user to remotely purchase goods and services from a variety of different on-line merchants over a distributed computer network such as the Internet. In such systems, the on-line merchant publishes an on-line catalog which can be viewed interactively by the end user at a personal computer. These catalogs include pictures, descriptions, and pricing information for the products and/or services of the respective merchants. In World Wide Web ("Web") based implementations, on-line catalogs are generally in the form of hypertext documents which are hosted by merchant Web sites which are accessed using a standard Web browser application which runs on the user computer. On-line catalogs for multiple merchants may alternatively be hosted by a centralized computer of an on-line services network, such as MSN™, or by an Internet site which is accessed using a proprietary client application (such as the client application of eShop Inc.).

In either case, the present invention can be used to customize a stand alone or syndicate merchant's on-line shopping web page that is sent to a customer whose computer has an identification tag accessible to the merchant server computer. As described above, the stand alone or syndicate merchant's server computer retrieves the identification tag from the cookie file on the customer's computer and uses the tag to select and retrieve in real-time, relevant demographic and buyer preference information from the database. The merchant server computer uses the retrieved marketing information to customize the shopping web page that is sent to the customer.

The use of a customized communication such as a web page resulting from the methods and systems of the present invention, provides the ability to market a broad range of products and services. The relevant demographic and buyer preference information obtained in real-time and at the point-of-contact with a repeat customer to the syndicate allows for more personalized web page browsing, increasing web site "stickiness" and resulting in increased sales and customer satisfaction.

The present methods and systems also provide a valuable cue for cross-selling strategies by delivering marketing decision information online directly to the customer service representative. It enhances marketing efforts without sacrificing risk policies, particularly in the case where personal customer information is limited to postal address information. Use of geodemographic databases makes available thousands of national product profiles from dozens of categories of consumer behavior and accommodates custom profiling for more precise targeting of products and services. This approach also eliminates guess work on the part of customer service representatives, because the recommended products or services output in the customized communication are rank-ordered by the likelihood-to-buy index. Opportunity costs are avoided by marketing other products/services at the beginning of the account life-cycle.

While the invention has been described with reference to only a limited number of embodiments, it will be appreciated that, given the preceding disclosure and knowledge of the principles upon which the invention is based, be able to make various changes and modifications without departing from the scope of the invention which is limited only by the appended claims.

What is claimed is:

1. A method of utilizing transaction relevant customer information relating to a customer for facilitating a transaction between a merchant and the customer, comprising:
   (a) obtaining, from a customer computer, customer postal identification information sufficient to identify a customer segment but insufficient to identify the customer;
   (b) generating a memory sector identifying code based on the postal identification information;
   (c) sending the sector code to a merchant computer;
   (d) creating an anonymous customer identification tag;
   (e) storing the tag on the customer computer;
   (f) creating an anonymous customer identification tag based on the postal identification information to identity the customer segment but insufficient to identity the customer, and storing the tag on a customer computer, said tag providing an address to a segment of the geodemographic database of transaction relevant customer information that is relevant to the group of people of which the customer is a member
   (g) retrieving the anonymous identification tag from the customer computer by the merchant computer when the customer computer accesses the merchant computer for the purpose of entering into a transaction;
   (h) in response to the retrieved anonymous identification tag from the customer computer, retrieving relevant customer information from a segment of a geodemographic memory database identified by the tag for the group of people of which the customer is a member, the geodemographic database including transaction relevant customer information arranged in customer segments comprising groups of people without identifying particular individuals; and
   (i) using the retrieved transaction relevant customer information to customize communication between the merchant computer and the customer computer, whereby transaction relevant customer information relating to a group of people, of which the customer is a member, is provided and used between a merchant and the customer.

2. A method as set forth in claim 1, wherein said transaction relevant information is based solely on the postal address of the customer.

3. A method as set forth in claim 1, wherein said transaction relevant information includes buying preferences and lifestyles of the customer.

4. A method as set forth in claim 1, wherein said transaction relevant information comprises buying preferences of individuals other than the customer.

5. A method as set forth in claim 4, wherein said buying preferences of individuals other than the customer are linked to a geographic location.

6. A method as set forth in claim 1, wherein said postal information is a unit of census or a ZIP code.

7. A method as set forth in claim 1, further including deleting said postal identification information after creating the anonymous identification tag.

8. A method as set forth in claim 1, wherein said communication between the merchant computer and the customer computer is a web page.

9. A method as set forth in claim 1, wherein said memory for storing a geodemographic database of transaction relevant customer information is part of a stand alone merchant server computer.

10. A method as set forth in claim 1, wherein said merchant computer is a member of a syndicate, said syndicate comprising at least two merchant sewer computers, and wherein said memory for storing a geodemographic database of transaction relevant customer information is provided by a marketing information service provider server computer that is shared by merchants of the syndicate.

11. A method as set forth in claim 10, wherein said stored identification tag is accessible only by merchant computers of the syndicate.

12. A system for utilizing transaction relevant customer information relating to a customer for facilitating a transaction between a merchant computer and the customer computer, comprising:
   (a) means responsive to the customer computer for obtaining customer postal identification information sufficient to identify the customer segment but insufficient to identify the customer;
   (b) means for generating a memory sector identifying code based on the postal identification information;
   (c) means for sending the sector code to the merchant computer;
   (d) means for creating an anonymous customer identification tag;
   (e) means for storing the tag on the customer computer;
   (f) means for retrieving the anonymous identification tag from the customer computer by the merchant computer when the customer computer accesses the merchant computer for the purpose of entering into a transaction;
   (g) means responsive to the retrieved anonymous identification tag from the customer computer, for retrieving relevant customer information from a segment of the geodemographic memory database identified by the tag for the group of people of which the customer is a member, the geodemographic database including transaction relevant customer information arranged in customer segments comprising groups of people without identifying particular individuals; and
   (h) means for using the retrieved transaction relevant customer information to customize communication between the merchant computer and the customer computer, whereby transaction relevant customer information relating to a group of people, of which the customer is a member, is provided and used between a merchant and the customer.

13. A system as set forth in claim 12, wherein said transaction relevant information is based solely on the geographic location of the customer's household.

14. A system as set forth in claim 12, wherein said transaction relevant information includes buying preferences and lifestyle of the customer.

15. A system as set forth in claim 12, wherein said transaction relevant information includes buying preferences of individuals other than the customer.

16. A system as set forth in claim 15, wherein said buying preferences of individuals other than the customer is linked to a geographic location.

17. A system as set forth in claim 12, wherein said postal information is a unit of census or a ZIP codes.

18. A system as set forth in claim 12, wherein said communication between the merchant computer and the customer computer is a web page.

19. A system as set forth in claim 12, further including means for deleting said postal identification information.

20. A system as set forth in claim 12, wherein said memory for storing a geodemographic database of transaction relevant customer information is part of a stand alone merchant server computer.

21. A system as set forth in claim 12, wherein said merchant computer is a member of a syndicate, said syndicate comprising at least two merchant server computers, and wherein said memory for storing a database of transaction relevant customer information is provided by a marketing information service provider server computer that is shared by merchants of the syndicate.

22. A system as set forth in claim 20, wherein said stored identification tag is accessible only by merchant computers of the syndicate.

23. A method of utilizing transaction relevant customer information for facilitating a transaction between a merchant and the customer, comprising:
   (a) using a merchant server computer;
   (b) using a memory storing a geodemographic database of transaction relevant customer information;
   (c) obtaining customer postal identification information from a customer computer which accesses via a network said merchant serve computer;
   (d) sending the postal identification information to the memory;
   (e) generating a memory sector identifying code based on the postal identification information
   (f) sending the sector code to the merchant computer;
   (g) creating an anonymous customer identification tag; and
   (h) storing the tag on the computer.

* * * * *

UNITED STATES PATENT AND TRADEMARK OFFICE
CERTIFICATE OF CORRECTION

PATENT NO. : 6,879,960 B2
DATED : April 12, 2005
INVENTOR(S) : Robert A. Nascenzi et al.

It is certified that error appears in the above-identified patent and that said Letters Patent is hereby corrected as shown below:

Column 9,
Line 7, delete "cate comprising at least two merchant sewer computers, and" insert
-- cate comprising at least two merchant server computers, and --

Signed and Sealed this

Twenty-first Day of June, 2005

JON W. DUDAS
*Director of the United States Patent and Trademark Office*